US011926341B2

(12) United States Patent
Park et al.

(10) Patent No.: US 11,926,341 B2
(45) Date of Patent: Mar. 12, 2024

(54) TRAFFIC-RULE-COMPLIANT DECISION-MAKING IN DYNAMIC TRAFFIC SCENARIOS

(71) Applicants: Robert Bosch GmbH, Stuttgart-Feuerbach (DE); Mercedes-Benz Group AG, Stuttgart (DE)

(72) Inventors: Chunki Park, San Jose, CA (US); Benjamin Ulmer, Sunnyvale, CA (US); Jan KleinDieck, Ludwigsburg (DE); Dominik Maucher, Stuttgart (DE); Felix Kunz, Stuttgart (DE); Jinsung Kwon, Saratoga, CA (US)

(73) Assignees: Mercedes-Benz Group AG, Stuttgart (DE); Robert Bosch GmbH, Stuttgart-Feuerbach (DE)

( * ) Notice: Subject to any disclaimer, the term of this patent is extended or adjusted under 35 U.S.C. 154(b) by 0 days.

(21) Appl. No.: 17/976,257

(22) Filed: Oct. 28, 2022

(65) Prior Publication Data
US 2023/0062581 A1 Mar. 2, 2023

Related U.S. Application Data

(63) Continuation of application No. PCT/EP2021/060986, filed on Apr. 27, 2021.

(51) Int. Cl.
*B60W 60/00* (2020.01)
*B60W 40/04* (2006.01)

(52) U.S. Cl.
CPC .......... *B60W 60/001* (2020.02); *B60W 40/04* (2013.01); *B60W 2554/20* (2020.02); *B60W 2554/40* (2020.02); *B60W 2556/45* (2020.02)

(58) Field of Classification Search
None
See application file for complete search history.

(56) References Cited

U.S. PATENT DOCUMENTS

| 8,005,616 | B2 | 8/2011 | Beuschel et al. |
| 8,510,027 | B2 | 8/2013 | Tajima et al. |

(Continued)

FOREIGN PATENT DOCUMENTS

| CN | 104700658 A | 6/2015 |
| CN | 109947110 A | 6/2019 |

(Continued)

OTHER PUBLICATIONS

PCT International Search Report and English translation, App. No. PCT/EP2021/060986, dated Jul. 22, 2021, 14 pages.

(Continued)

*Primary Examiner* — David P. Merlino
(74) *Attorney, Agent, or Firm* — Barley Snyder

(57) ABSTRACT

A method for determining a driving maneuver of a vehicle with a control unit includes receiving a measurement data relating to a traffic situation from a sensor, determining a current detection area of the sensor by evaluating the measurement data, and creating a sensor model based on the measurement data. An estimated detection area of the sensor from the measurement data is modelled through forward simulation based on a vehicle position of the vehicle. A change in the estimated detection area of the sensor due to a driving maneuver is determined along with the driving maneuver that causes an increase in the estimated detection area due to the sensor model.

15 Claims, 3 Drawing Sheets

(56) References Cited

U.S. PATENT DOCUMENTS

| | | |
|---|---|---|
| 8,589,014 B2 | 11/2013 | Fairfield et al. |
| 10,663,976 B2 | 5/2020 | Dolgov et al. |
| 2009/0070039 A1 | 3/2009 | Beuschel et al. |
| 2012/0029813 A1* | 2/2012 | Tajima .................. G08G 1/164 701/300 |
| 2015/0127190 A1 | 5/2015 | Fuehrer |
| 2018/0231974 A1* | 8/2018 | Eggert .............. B60W 60/0027 |
| 2018/0284234 A1* | 10/2018 | Curatu ................ G05D 1/0088 |
| 2019/0279383 A1* | 9/2019 | Angelova ............. G06N 3/045 |
| 2019/0310654 A1* | 10/2019 | Halder ................ G05D 1/0088 |
| 2020/0090522 A1* | 3/2020 | Emura ................ G05D 1/0219 |

FOREIGN PATENT DOCUMENTS

| | | | |
|---|---|---|---|
| CN | 110588607 A | | 12/2019 |
| DE | 10 2013 222 586 A1 | | 5/2015 |
| DE | 102015212015 A1 | * | 12/2016 |
| DE | 102018117830 A1 | * | 1/2020 |
| EP | 2028072 A2 | | 2/2009 |
| EP | 3599141 A1 | * | 1/2020 ............ B60W 30/10 |
| JP | H07334800 A | | 12/1995 |
| JP | 2003228800 A | | 8/2003 |
| JP | 2014180986 A | | 9/2014 |
| KR | 1020150111983 A | | 10/2015 |
| KR | 1020190003800 A | | 1/2019 |
| WO | 2006042512 A1 | | 4/2006 |
| WO | 2010143291 A1 | | 12/2010 |

OTHER PUBLICATIONS

First Office Action from the Intellectual Property Office of China dated Feb. 21, 2023, corresponding to Application No. 202180031740. X, 5 pages.

Office Action from the Intellectual Property Office of Korea dated May 19, 2023 with English translation thereof, corresponding to Application No. 10 2022 7041321, 15 pages.

Japanese Office Action dated Aug. 8, 2023 with English translation, corresponding to Application No. 2022-565688, 9 pages.

* cited by examiner

TRAFFIC-RULE-COMPLIANT DECISION-MAKING IN DYNAMIC TRAFFIC SCENARIOS

CROSS-REFERENCE TO RELATED APPLICATIONS

This application is a continuation of PCT International Application No. PCT/EP2021/060986, filed on Apr. 27, 2021, which claims priority under 35 U.S.C. § 119 to German Patent Application No. 102020111486.9, filed on Apr. 28, 2020.

FIELD OF THE INVENTION

The invention relates to a method for determining a driving maneuver of a vehicle, a control unit, a computer program, and a machine-readable storage medium.

BACKGROUND

The handling of dynamic traffic situations is often impeded due to restricted visibility or due to obscuring of the detection area of an environment sensor system. The detection area of the environment sensor system can be obscured, for example, by other road users or dynamic objects or by stationary obstacles, such as trees, buildings or parked vehicles.

Obscuring objects of this type which restrict the detection area of the environment sensor system must be taken into account in order to implement automated driving functions. In particular, a future change in the detection area due to a movement of the vehicle performing the automated driving functions or due to movement of dynamic objects, such as, for example, trucks, must be taken into account.

The detection area of the environment sensor system of the vehicle can vary even when stationary if road users leave the scanning area of the environment sensor system or drive into the scanning area.

Methods are known for carrying out a partially observable Markov decision process. However, methods of this type require intensive processing and cannot be implemented in normal control units on-board vehicles.

SUMMARY

A method for determining a driving maneuver of a vehicle with a control unit includes receiving a measurement data relating to a traffic situation from a sensor, determining a current detection area of the sensor by evaluating the measurement data, and creating a sensor model based on the measurement data. An estimated detection area of the sensor from the measurement data is modelled through forward simulation based on a vehicle position of the vehicle. A change in the estimated detection area of the sensor due to a driving maneuver is determined along with the driving maneuver that causes an increase in the estimated detection area due to the sensor model.

BRIEF DESCRIPTION OF THE DRAWINGS

The invention will now be described by way of example with reference to the accompanying Figures, of which.

DETAILED DESCRIPTION OF THE EMBODIMENT(S)

Exemplary embodiments of the invention are explained in detail below with reference to the substantially simplified schematic representations.

Figure 1:
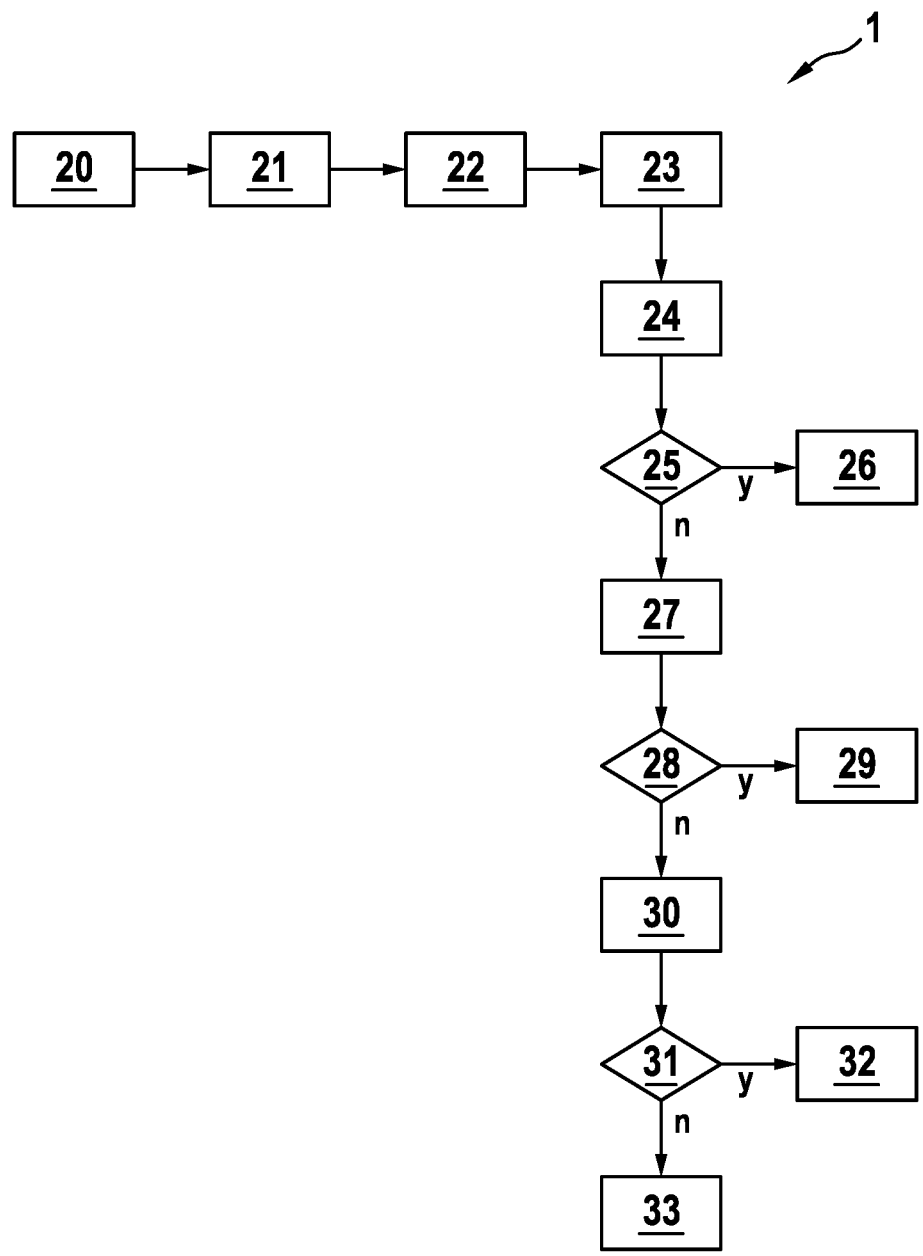
FIG. 1 is a flowchart of a method according to an embodiment.

FIG. 1 shows a schematic flow diagram to illustrate a method 1 according to one embodiment. The method determines a driving maneuver of a vehicle 2 which is operable in an automated manner. The method 1 can be carried out by a control unit 4, shown in FIGS. 2 and 3.

The control unit 4 can, for example, be a control unit 4 on-board the vehicle 2, a control unit outside the vehicle 2 or a server unit outside the vehicle 2, such as, for example, a cloud system. The control unit 4 can receive and evaluate measurement data determined from at least one sensor on-board the vehicle 2.

In an embodiment, a computer program is provided which comprises commands which, when the computer program is executed by the control unit 4, can prompt the latter to carry out the method according to the invention described herein. A non-transitory computer-readable storage medium is provided on which the computer program according to the invention is stored.

Figure 2:
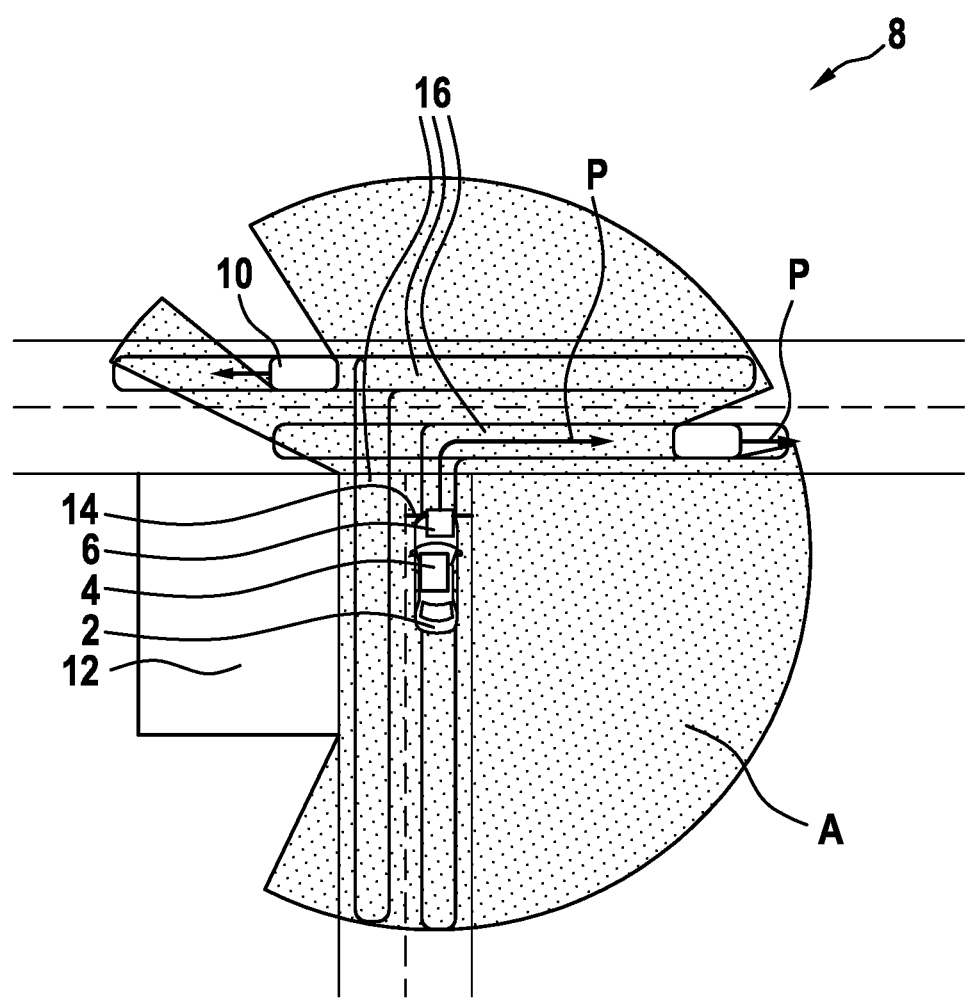
FIG. 2 is a schematic top view of an exemplary traffic situation.

The vehicle 2 is shown by way of example in FIG. 2 and has an environment sensor system 6 in addition to the control unit 4. The environment sensor system 6 can consist of one or more sensors. The environment sensor system 6 can have, for example, radar sensors, LIDAR sensors, ultrasound sensors, camera sensors and the like.

The vehicle 2 can be operable here as assisted, partially automated, highly automated and/or fully automated or driverless according to the BASt standard. The vehicle 2 can be designed, for example, as a passenger vehicle, a robot, a drone, a watercraft, a rail vehicle, a robotaxi, an industrial robot, a utility vehicle, a bus, an aircraft, a helicopter and the like.

In a step 20 shown in FIG. 1, measurement data relating to a traffic situation 8 are received from at least one sensor 6. The method 1 can be initiated by an identified traffic situation 8, such as, for example, an intersection or an approach road to a main road.

In an embodiment, communication data are received via a communication connection, wherein the sensor model is created on the basis of the received measurement data and on the basis of the data received via the communication connection. The sensor model can be designed as more precise by this measure, since additional measurement data are received from road users or from infrastructure units. The data can be received via a vehicle-2-infrastructure or a vehicle-2-vehicle communication connection. In particular, a precise prediction of a future behavior of road users can be performed as a result.

A current detection area is then determined 21, as shown in FIG. 1, by evaluating the received measurement data. A current detection area or a current degree of visibility of the at least one sensor 6 is determined by evaluating the received measurement data. The degree of visibility can be defined as a measure of the range or the obscuring of a scanning area of at least one sensor. In an open area without obstacles, the degree of visibility of a sensor which represents the detection area of the sensor can, for example, be 100%. With an increasing number of obstacles, the degree of visibility is reduced or the detection area becomes smaller.

The current degree of visibility represents the degree of visibility at the time when the measurement data are received. The detection area can be designed as an area or as a volume which can be scanned or registered by the sensor system 6 in order to determine measurement data.

In an embodiment, the current detection area is determined by identifying dynamic objects 10 and/or static objects 12 on the basis of the received measurement data. The influence of the environment on the detection area or the degree of obscuring of the detection area can be estimated by this measure. In particular, parked vehicles, containers, buildings, vegetation and the like can be assigned to static objects 12 which are unlikely to change over time and therefore do not affect the detection area if the position of the sensors or the vehicle 2 remains unchanged. In the case of dynamic objects 10, the detection area can also be changed without a vehicle movement of the vehicle 2 on which the sensors for environment detection are fitted.

Map information can also be received by the control unit 4 in order to determine the detection area or the degree of obscuring of the detection area.

According to a further exemplary embodiment, the current detection area is determined on the basis of a traffic lane interval 16 measurable by sensors which approximates traffic lanes determined on the basis of the measurement data by rectangles of differing length and/or width. The method can thus define and measure the visible areas and therefore also the detection area in the form of a traffic lane interval coverage. The traffic lane interval coverage can be approximated by rectangles which overlay the traffic lane sections which are visible or are measurable by the sensor system 6. A rectangle, a polygon, a triangle, a circle and the like can be used for each detectable traffic lane section. The method can be restricted as a result to the areas which are relevant to the automated driving function.

A sensor model is created on the basis of the received measurement data and an estimated detection area of the at least one sensor 6 is modelled 22 from the received measurement data through forward simulation based on a vehicle position of the vehicle 2. The forward simulation is performed by the sensor model and enables the estimation of a likely change in the detection area due to a change in the position of the sensor 6. The created sensor model can be compared with the actual traffic situation at the time when the measurement data are created or received.

The quality of the sensor model can be determined and optionally improved through this measure.

The created sensor model is used to determine 23 a change in the detection area due to at least one driving maneuver. A plurality of different driving maneuvers are checked, for example, for this purpose to ascertain whether they increase or reduce the detection area. The change in the detection area is determined by the sensor model by an execution of one or more driving maneuvers. A predefined list of possible driving maneuvers can be checked by the sensor model for this purpose. A stopping of the vehicle can similarly be implemented as a driving maneuver.

In the exemplary embodiment shown, a plurality of examples of driving maneuvers are executed or checked in succession. Alternatively, a parallel check of the possible driving maneuvers can be implemented. Verifying possible driving maneuvers in parallel allows for the method to be carried out more quickly. If the driving maneuvers are checked in succession, predefined checking steps, for example, can be implemented. The driving maneuvers are compared or selected with a view to optimizing the degree of visibility.

In an embodiment, the at least one driving maneuver is a slow drive ahead, an entry into a traffic intersection, a turn, a stopping or remaining stationary, and is used to determine a change in the detection area by the created sensor model.

A driving maneuver is then determined which, due to the sensor model, results in an increase in the simulated degree of disability or an increase in the simulated detection area of the at least one sensor. To do this, the results of the driving maneuvers that are used can be compared with one another and/or with the current traffic situation or the current degree of visibility.

By the method, sensor-based or measurement-data-based sensor models can be created which are usable in order to optimize the detection area or the degree of visibility. In particular, a future detection area of the sensor system 6 of the vehicle can be increased, wherein the decision regarding the driving maneuver to be executed is made by the control unit 4 depending on the improvement in the degree of visibility. The degree of visibility can be improved if the detection area of the sensor is increased. The increase can be designed in the form of an increased angle and/or in the form of an increased range of the detection area. The detection area can be increased if the detection area is obscured by fewer obstacles, by obstacles at a greater distance from the sensor system 6 or by smaller obstacles or by no obstacles.

Following the determination of the driving maneuver which increases the detection area, control commands which are usable to control the vehicle 2 can be generated by the control unit 4. The vehicle 2 can thus be prompted by the control unit 4 to perform the determined or chosen driving maneuver.

The created sensor model can take account of road users detected in the scanning area of the sensors, static objects and dynamic objects, and can predict their future behavior. In particular, static and dynamic factors which affect the detection area can thereby be determined. In addition to the detection area, priority rules, such as, for example, relating to non-observable or non-detectable road users, risks of collision, comfort factors and possible violations of traffic rules can further be taken into account by the created sensor model.

Road safety and comfort during an automated driving operation can be increased by the method. The automatically operated vehicle can further be prevented from blocking the traffic and a particularly smooth traffic flow can be enabled.

The decision regarding the driving maneuver can be made, for example, in the form of tree-search algorithms. Alternatively or additionally, a sequence of driving maneuvers can be and can therefore be selected as advantageous in respect of the detection area of the sensor. The tree search can extend over a time period which extends over several seconds into the future and is therefore designed as discrete. Possible driving maneuvers can be recalculated continuously as soon as new measurement data are available from at least one sensor. Existing or active tree searches can be interrupted with the occurrence of new measurement data and/or environment information. Alternatively or additionally, existing or active tree searches can continue to be carried out with the occurrence of new measurement data and/or environment information, wherein at least one new, parallel tree search based on the new measurement data is started.

As soon as a performed tree search converges, the result of the converged tree search can be used. The result can occur in the form of a driving maneuver which causes an increase in the simulated detection area due to the sensor model. The increase in the detection area results in a reduced degree of obscuring of the detection area.

On the basis of the method, the vehicle 2 can, for example, in the presence of static objects in the vehicle environment of a road junction, as a behavioral sequence of a plurality of consecutive driving maneuvers, perform an approach to a stop line 14, a slow approach over a defined distance to the intersection and a subsequent crossing of the intersection.

In the presence of dynamic objects 10 in the vehicle environment, the vehicle 2 can, for example, first stop at a stop line 14 and, if the detection area is adequate, can cross the intersection.

In a further step 24 shown in FIG. 1, an entry of the vehicle 2 into the road junction or into a traffic intersection is simulated by the sensor model and the change in the detection area is determined.

If the detection area is increased 25 compared with the initial detection area or a safe execution of the driving maneuver is confirmed, an execution of the driving maneuver can be initiated 26 by the control unit 4. If this request 25 is declined, the next driving maneuver 27 can be checked.

A stopping of the vehicle 2 at the initial position, for example, can be checked by the sensor model as the next driving maneuver.

The change in the detection area is determined 28 in the check. If road safety is guaranteed when the vehicle stops and the detection area is increased as a result of the vehicle stopping, for example because road users leave the detection area of the environment sensor system 6, a stop is initiated 29 by the control unit 4. Otherwise, the next maneuver 30 is checked.

A slow and cautious approach 30 to the traffic intersection, shown in FIG. 1, can be considered by the sensor model as the next driving maneuver. If a driving maneuver of this type is categorized as safe and enables an increase in the detection area 31, the control unit 4 initiates the slow and cautious approach of the vehicle 2 to the traffic intersection 32. If this check 31 is declined or categorized as negative, the vehicle 2 can remain 33 at its initial position.

FIG. 2 shows a top view of an example of a traffic situation 8. Dynamic objects 10 or obstacles and static objects 12 or obstacles are present. The dynamic objects 10 are, for example, road users which obscure parts of the scanning area A of the vehicle 2. The static objects 12 considered can be buildings or parked road users. The arrows P indicate the planned trajectories of the road users 10 and of the vehicle 2.

In the traffic situation 8 shown in FIG. 2, the vehicle 2 stops at a stop line 14 in front of a T-junction. In order to implement a decision, the method 1 is carried out by the control unit 4. A current or initial detection area of the environment sensor system 6 is determined for this purpose.

The detection area and, in particular, a dimension or size of the detection area, is determined on the basis of the traffic lane intervals 16 detected by sensors. The traffic lane intervals 16 are the sections of the traffic lanes identified in the scanning area A and are approximated by rectangles.

The rectangles have different lengths or widths and can be used in order to determine the size of the detection area. A total length or a total area of the determined traffic lane intervals 16 can be used as a measure of the detection area.

In a further exemplary embodiment, the detection area is increased if a total length and/or total area of the traffic lane intervals 16 approximated by the triangles increases. A particularly efficient parameter for selecting driving maneuvers can be provided by this measure. In particular, the total length or the total area can be determined in a technically simple manner and can be used for comparison purposes.

Figure 3:
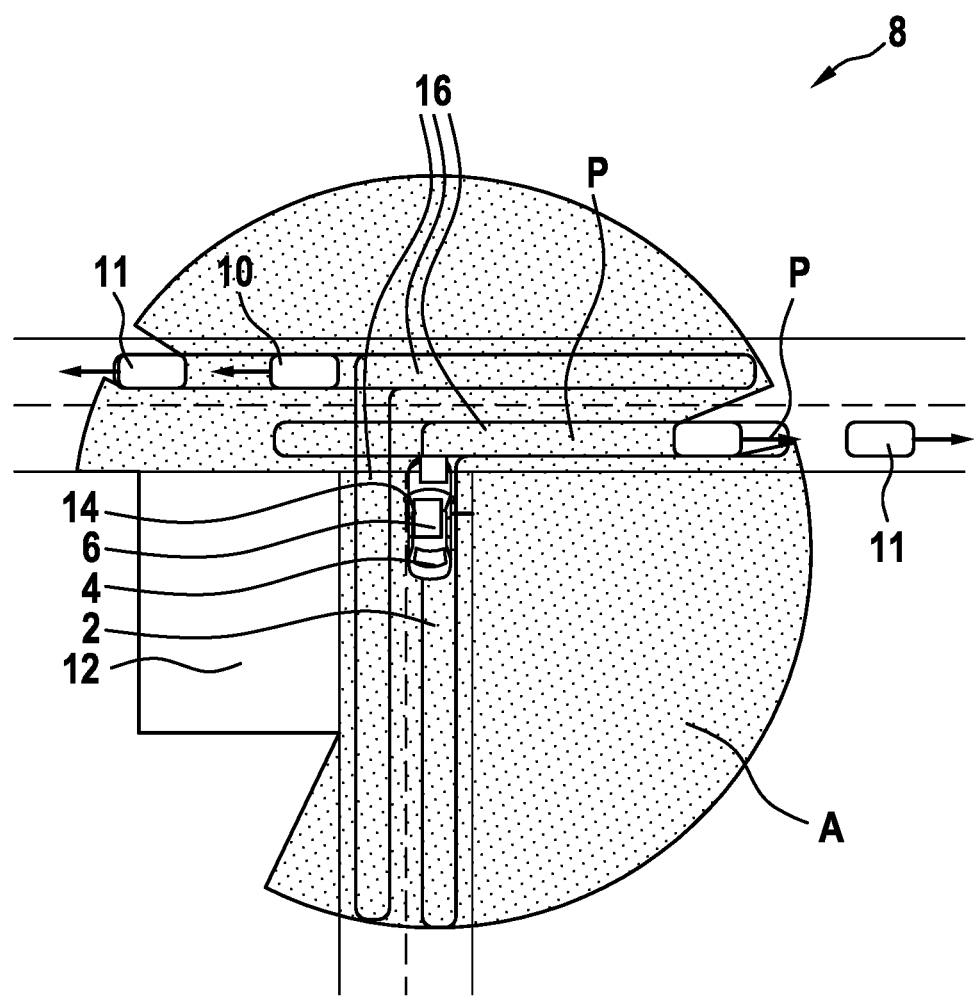
FIG. 3 is a schematic top view of the exemplary traffic situation of FIG. 2 at a later time.

FIG. 3 shows a top view of the traffic situation 8 shown in FIG. 2 at a later time. The vehicle 2 has slowly and cautiously approached the traffic intersection or the T-junction and has driven over the stop line 14, wherein the positions of the static objects 12 and the dynamic objects 10 relative to the vehicle 2 have changed.

The scanning area A has changed and the detection area has increased due to the performed driving maneuver. As a result, additional dynamic road users 11 are detectable by sensors and the total area or total length of the traffic lane intervals 16 is greater compared with the situation in FIG. 2.

What is claimed is:

1. A method, comprising:
 receiving a measurement data relating to a traffic situation from a sensor;
 determining a size of a current detection area of the sensor by evaluating the measurement data, the current detection area represents a detection area at a time when the measurement data are received;
 creating a sensor model based on the measurement data;
 modelling a size of an estimated detection area of the sensor from the measurement data through forward simulation based on a vehicle position of a vehicle;
 determining a change in the size of the estimated detection area of the sensor due to a driving maneuver; and
 determining the driving maneuver that causes an increase in the size of the estimated detection area due to the sensor model.

2. The method of claim 1, wherein the driving maneuver is a slow drive ahead, an entry into a traffic intersection, a turn, or a stopping or remaining stationary.

3. The method of claim 2, wherein the driving maneuver is used to determine the change in the size of the estimated detection area by the sensor model.

4. The method of claim 1, wherein the size of the current detection area is determined by identifying a dynamic object and/or a static object on the basis of the measurement data.

5. The method of claim 1, wherein, in the step determining the change in the size of the estimated detection area of the sensor, a plurality of different driving maneuvers are assessed.

6. The method of claim 5, wherein the plurality of different driving maneuvers are assessed in parallel by the sensor model.

7. The method of claim 5, wherein the plurality of different driving maneuvers are assessed in succession by the sensor model.

8. The method of claim 1, wherein the size of the estimated detection area is determined based on a plurality of traffic lane intervals that approximate a plurality of traffic lanes in the measurement data.

9. The method of claim 8, wherein the traffic lane intervals are a plurality of rectangles of differing length and/or width, or triangles of differing area.

10. The method of claim 9, wherein the size of the estimated detection area is increased if a total length and/or a total area of the traffic lane intervals is increased.

11. The method of claim 1, further comprising receiving a plurality of communication data via a communication connection.

12. The method of claim 11, wherein the sensor model is created based on the measurement data and the communication data.

13. A control unit carrying out the method of claim 1.

14. A non-transitory computer readable medium storing a computer program product that, when executed by a control unit, carries out the method of claim 1.

15. A method, comprising:
receiving a measurement data relating to a traffic situation from a sensor;
determining a size of a current detection area of the sensor by evaluating the measurement data, the current detection area represents a degree of visibility at a time when the measurement data are received;
creating a sensor model based on the measurement data;
modelling a size of an estimated detection area of the sensor from the measurement data through forward simulation based on a vehicle position of a vehicle;
determining a change in the size of the estimated detection area of the sensor, the change in the size of the estimated detection area is determined by the sensor model by execution of one or more driving maneuvers of a predefined list of possible driving maneuvers checked by the sensor model;
determining the driving maneuver that results in an increase in the size of the estimated detection area simulated by the sensor model by comparing the change in the size of the estimated detection area determined for each of the predefined list of possible driving maneuvers to one another and/or to the current detection area; and
selecting the driving maneuver for execution using a control unit depending on the increase in the size of the estimated detection area.

* * * * *

UNITED STATES PATENT AND TRADEMARK OFFICE
CERTIFICATE OF CORRECTION

| | | |
|---|---|---|
| PATENT NO. | : 11,926,341 B2 | Page 1 of 1 |
| APPLICATION NO. | : 17/976257 | |
| DATED | : March 12, 2024 | |
| INVENTOR(S) | : Chunki Park | |

It is certified that error appears in the above-identified patent and that said Letters Patent is hereby corrected as shown below:

On the Title Page

Please insert item (30) Foreign Application Priority Data:
--Foreign Application Priority Data
April 28, 2020   (DE)............................10 2020 111 486.9--

Signed and Sealed this
Eighteenth Day of June, 2024

Katherine Kelly Vidal
*Director of the United States Patent and Trademark Office*